US012812541B2

(12) United States Patent
Leng et al.

(10) Patent No.: US 12,812,541 B2
(45) Date of Patent: Nov. 24, 2026

(54) UE MODE SWITCHING FOR POWER SAVING IN WIRELESS COMMUNICATION

(71) Applicant: Samsung Electronics Co., Ltd., Suwon-si (KR)

(72) Inventors: Shiyang Leng, Allen, TX (US); Kyeongin Jeong, Allen, TX (US); Hongbo Si, Allen, TX (US); Anil Agiwal, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 361 days.

(21) Appl. No.: 18/433,063

(22) Filed: Feb. 5, 2024

(65) Prior Publication Data

US 2024/0276380 A1 Aug. 15, 2024

Related U.S. Application Data

(60) Provisional application No. 63/445,942, filed on Feb. 15, 2023.

(51) Int. Cl.

*H04W 52/02* (2009.01)
*H04W 76/27* (2018.01)
*H04W 76/28* (2018.01)

(52) U.S. Cl.

CPC ....... *H04W 52/0235* (2013.01); *H04W 76/27* (2018.02); *H04W 76/28* (2018.02)

(58) Field of Classification Search

None
See application file for complete search history.

(56) References Cited

U.S. PATENT DOCUMENTS

| | | | | |
|---|---|---|---|---|
| 11,765,660 B2 * | 9/2023 | Kim | H04W 52/0235 370/318 |
| 12,557,022 B2 * | 2/2026 | Elshafie | H04W 52/0235 |
| 2022/0408362 A1 * | 12/2022 | Lee | H04W 52/0274 |
| 2024/0224184 A1 * | 7/2024 | Elshafie | H04W 52/0235 |
| 2024/0267849 A1 * | 8/2024 | Lu | H04W 76/19 |
| 2024/0276380 A1 * | 8/2024 | Leng | H04W 76/27 |

(Continued)

FOREIGN PATENT DOCUMENTS

KR 102464908 B1 11/2022

OTHER PUBLICATIONS

International Search Report and Written Opinion issued May 28, 2024 regarding International Application No. PCT/KR2024/002015, 7 pages.

(Continued)

*Primary Examiner* — Faiyazkhan Ghafoerkhan

(57) ABSTRACT

Methods and apparatuses for a UE mode switching operation for power saving in a wireless communication system. A method of a UE comprises: receiving, from a BS, configuration information related to mode switching events including a first mode switching event and a second mode switching event; when the first mode switching event occurs, switching an operation mode to a power saving mode from a normal mode by deactivating a MR operation and monitoring a LP-WUS; and when the second mode switching event occurs, switching the operation mode to the normal mode from the power saving mode by activating the MR operation.

20 Claims, 7 Drawing Sheets

(56) References Cited

U.S. PATENT DOCUMENTS

2024/0284456 A1* 8/2024 Elkotby ................ H04W 76/19

OTHER PUBLICATIONS

Samsung, "Signal design and procedure for LP-WUS", 3GPP TSG RAN WG1 #111, R1-2212072, Nov. 2022, 4 pages.
Intel Corporation, "Discussion on evaluations on LP WUS", 3GPP TSG RAN WG1 Meeting #111, R1-2211420, Nov. 2022, 16 pages.
Moderator (Nordic), "Final summary of discussions on L1 signal design and procedure for low power WUS", 3GPP TSG RAN WG1 #111, R1-2212978, Nov. 2022, 61 pages.
"5G; NR; NR and NG-RAN Overall description; Stage-2 (3GPP TS 38.300 version 17.3.0 Release 17)", ETSI TS 138 300 V17.3.0, Jan. 2023, 213 pages.
"5G; NR; Radio Resource Control (RRC); Protocol specification (3GPP TS 38.331 version 17.3.0 Release 17)", ETSI TS 138 331 V17.3.0, Jan. 2023, 1295 pages.
"5G; NR; User Equipment (UE) procedures in idle mode and in RRC Inactive state (3GPP TS 38.304 version 17.3.0 Release 17)", ETSI TS 138 304 V17.3.0, Jan. 2023, 53 pages.

* cited by examiner

UE MODE SWITCHING FOR POWER SAVING IN WIRELESS COMMUNICATION

CROSS-REFERENCE TO RELATED APPLICATIONS AND CLAIM OF PRIORITY

The present application claims priority to U.S. Provisional Patent Application No. 63/445,942, filed on Feb. 15, 2023. The contents of the above-identified patent documents are incorporated herein by reference.

TECHNICAL FIELD

The present disclosure relates generally to wireless communication systems and, more specifically, the present disclosure relates to a user equipment (UE) mode switching operation for power saving in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a UE mode switching operation for power saving in a wireless communication system.

In one embodiment, a user equipment (UE) in a wireless communication system is provided. The UE comprises a transceiver configured to receive, from a base station (BS), configuration information related to mode switching events including a first mode switching event and a second mode switching event. The UE further includes a processor operably coupled to the transceiver, the processor configured to: when the first mode switching event occurs, switch an operation mode to a power saving mode from a normal mode by deactivating a main radio (MR) and monitoring a low power-wake-up-signal (LP-WUS), and when the second mode switching event occurs, switch the operation mode to the normal mode from the power saving mode by activating the MR.

In another embodiment, a method of a UE in a wireless communication system is provided. The method comprises: receiving, from a BS, configuration information related to mode switching events including a first mode switching event and a second mode switching event; when the first mode switching event occurs, switching an operation mode to a power saving mode from a normal mode by deactivating a MR operation and monitoring a LP-WUS; and when the second mode switching event occurs, switching the operation mode to the normal mode from the power saving mode by activating the MR operation.

In yet another embodiment, a BS in a wireless communication system is provided. The BS comprises a processor configured to generate configuration information related to mode switching events including a first mode switching event and a second mode switching event. The BS further includes a transceiver operably coupled to the processor, the transceiver configured to transmit, to a UE, configuration information to switch an operation mode, wherein: when the first mode switching event occurs, the operation mode is switched to a power saving mode from a normal mode by deactivating a MR operation and monitoring a LP-WUS, and when the second mode switching event occurs, the operation mode is switched to the normal mode from the power saving mode by activating the MR operation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term “couple” and its derivatives refer to any direct or indirect communication between two or more elements, whether or not those elements are in physical contact with one another. The terms “transmit,” “receive,” and “communicate,” as well as derivatives thereof, encompass both direct and indirect communication. The terms “include” and “comprise,” as well as derivatives thereof, mean inclusion without limitation. The term “or” is inclusive, meaning and/or. The phrase “associated with,” as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term “controller” means any device, system, or part thereof that controls at least one operation. Such a controller may be implemented in hardware or a combination of hardware and software and/or firmware. The functionality associated with any particular controller may be centralized or distributed, whether locally or remotely. The phrase “at least one of,” when used with a list of items, means that different combinations of one or more of the listed items may be used, and only one item in the list may be needed. For example, “at least one of: A, B, and C” includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents are hereby incorporated by reference into the present disclosure as if fully set forth herein: "3GPP, TS 38.300 v17.3.0, 5G; NR; NR and NG-RAN Overall Description; Stage 2"; "3GPP, TS 38.331 v17.3.0, 5G; NR; Radio Resource Control (RRC); Protocol specification"; and "3GPP, TS 38.304 v17.3.0, NR; User Equipment (UE) procedures in Idle mode and RRC Inactive state."

Figure 1:
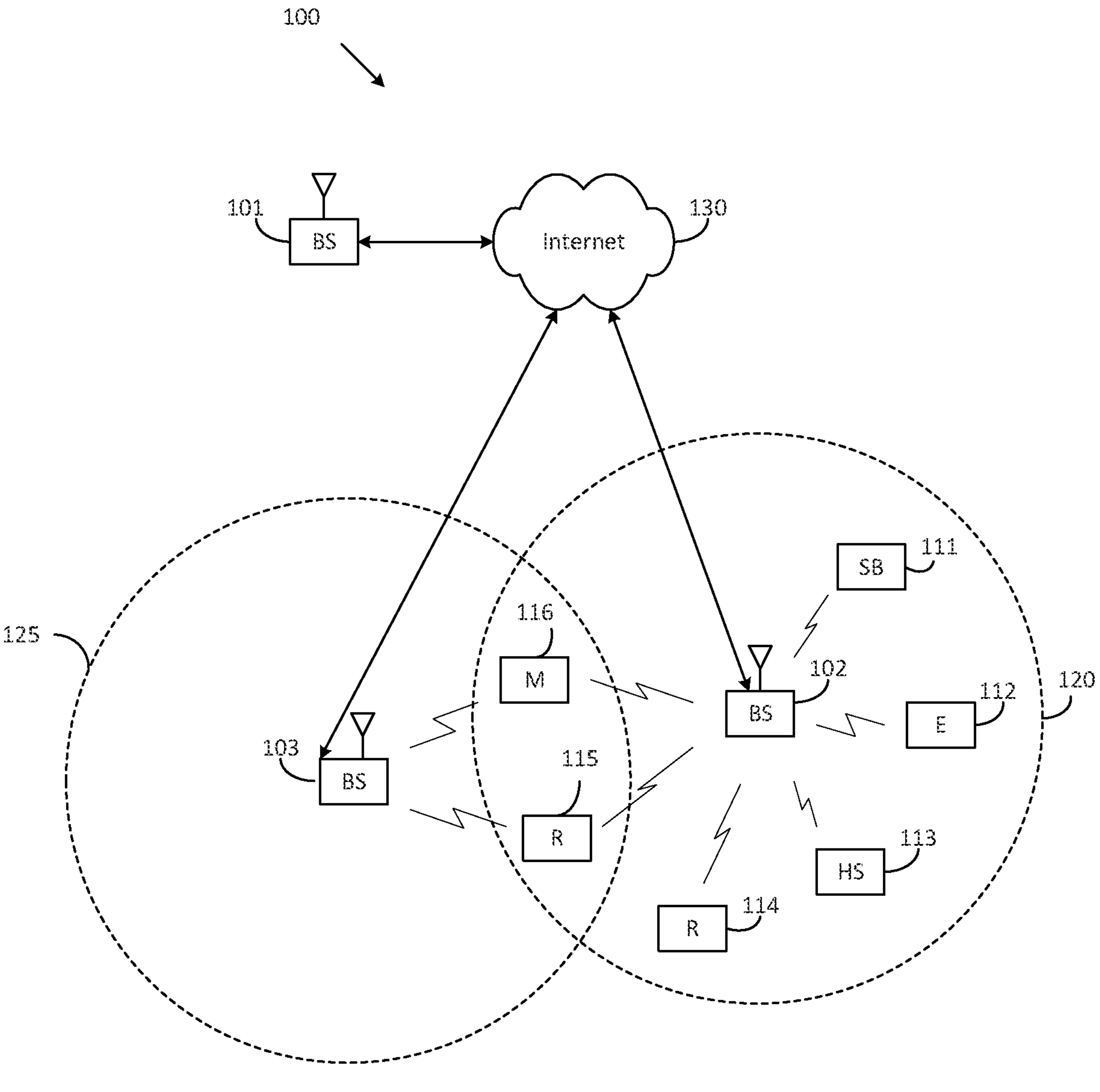
FIG. 1 illustrates an example of wireless network according to embodiments of the present disclosure.
Figure 2:
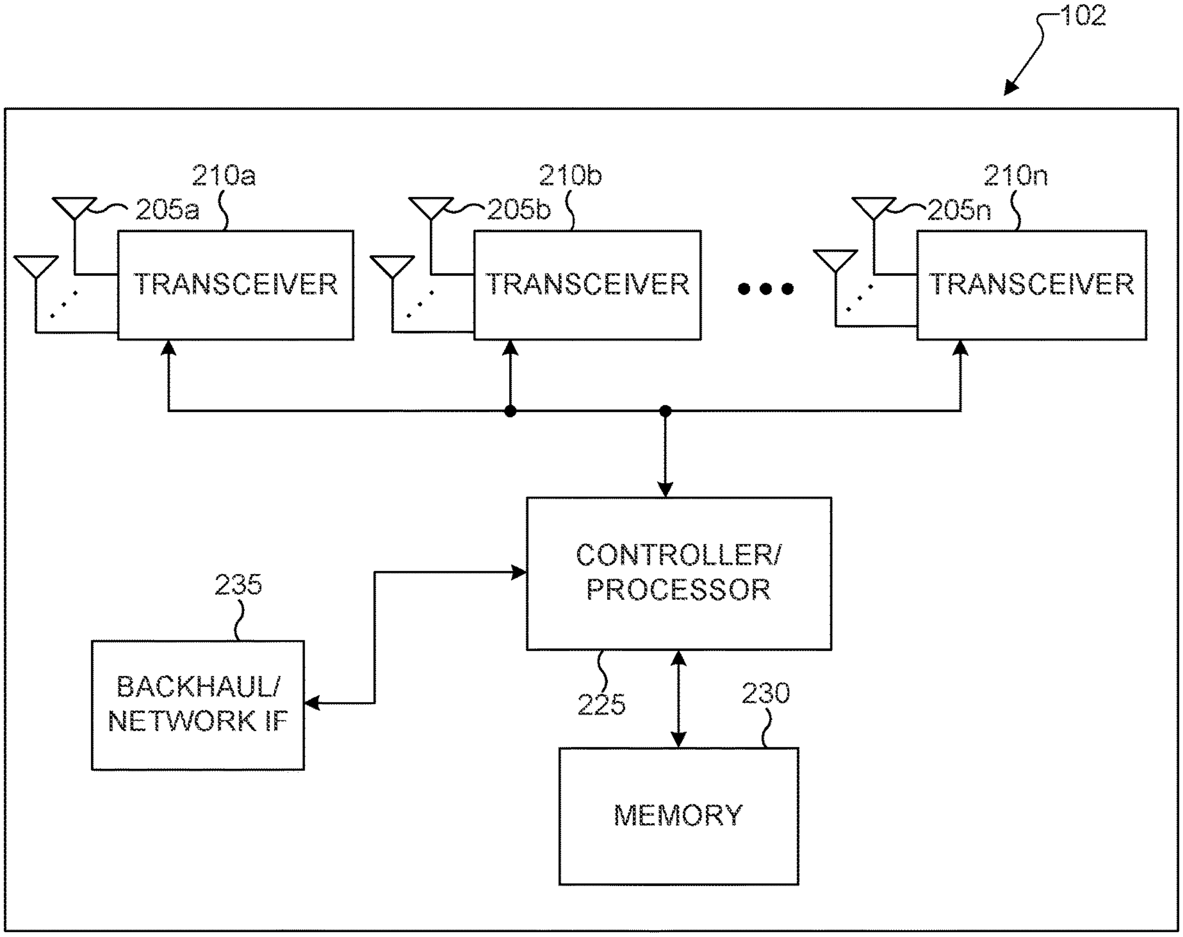
FIG. 2 illustrates an example of gNB according to embodiments of the present disclosure.
Figure 3:
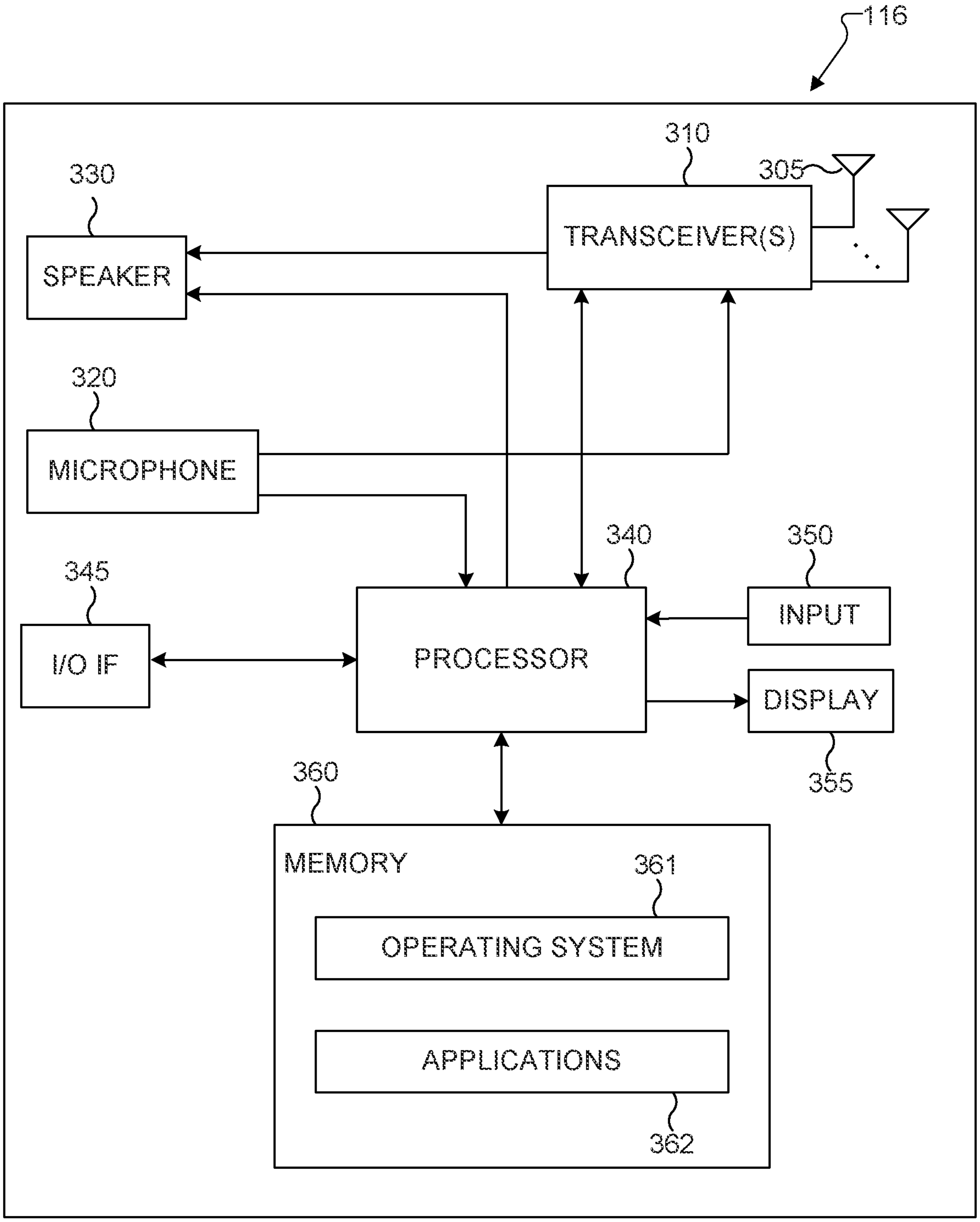
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a UE mode switching operation for power saving in a wireless communication system. In certain embodiments, and one or more of the gNBs 101-103 includes circuitry, programing, or a combination thereof, for supporting a UE mode switching operation for power saving in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes to support a UE mode switching operation for power saving in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a UE mode switching operation for power saving in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
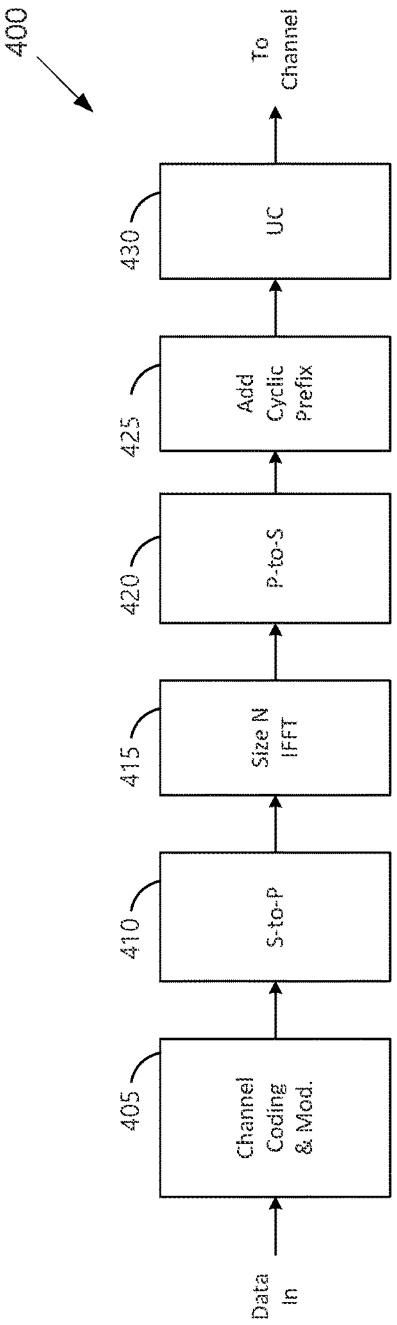
FIGS. 4 and 5 illustrate example of wireless transmit and receive paths according to this disclosure.
Figure 5:
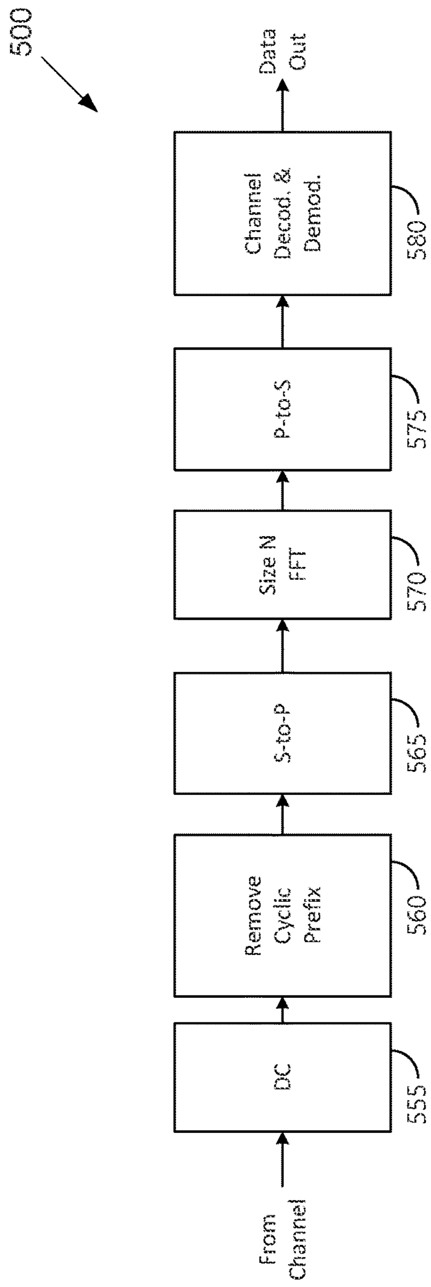

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support a UE mode switching operation for power saving in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The 3GPP has developed technical specifications and standards to define the new 5G radio-access technology, known as 5G new radio (NR). UE energy efficiency is critical to 5G system design, especially for small form-factor devices without continuous energy source, e.g., IoT devices, industrial sensors, controllers, and wearables. To save UE power consumption, extended discontinuous reception (eDRX) with long wake-up periods is expected to be used. However, large eDRX cycles cannot meet the low latency requirement for latency-critical use cases. On the other hand, the UE needs to periodically wake up per eDRX cycle even there is no signaling or data traffic, which may waste power. It is desired that the UE can wake up with short delay, while only at triggered occasions. To this end, a wake-up signal (WUS) to trigger the main radio (MR) is to be designed and a separate receiver, namely, lower power radio (LR), which has the ability to monitor wake-up signal with ultra-low power consumption is expected to be used. Main radio works for data transmission and reception, which can be turned off or set to deep sleep unless the main radio is turned on.

A UE can monitor a type of signal with low reception power (e.g., lower-power wake-up signal (LP WUS)) in a power-saving mode (e.g., operating with a lower power radio) while the main radio can be turned off. However, the UE operating with LR usually can only support limited functionalities and operations, e.g., receiving LP WUS, performing neighbor cell measurement of LP WUS. To perform other operations, e.g., system information acquisition, receiving paging message, the UE needs to turn on MR to operate in a normal mode. Thus, the mode switching between the power-saving mode (e.g., operating with LR) and the normal mode (e.g., operation with MR) and the corresponding procedures need to be specified.

In the present disclosure, the procedure of mode switching for power saving is provided. The mode switching procedures involving an RRC_IDLE/INACTIVE/CONNECTED state are specified.

In the present disclosure, the power-saving mode can refer to operating with LR and/or deactivating the MR; the normal mode can refer to operating with MR. Switching to normal mode can refer to turning on MR; switching to power-saving mode can refer to turning on LR and/or deactivating the MR. The terminology LP WUS can refer to a type of signal received by low power receiver with low power and can be replaced by equivalent terminology such as low power synchronization signal (LP SS).

A UE in an RRC_IDLE state can operate in a power-saving mode. In one embodiment, a power-saving mode in an RRC_IDLE state can be characterized by a UE performing one or more of the following operations based on LP WUS: (1) monitoring LP WUS of the camped cell; (2) UE controlled mobility based on LP WUS; (3) neighbor cell measurement of LP WUS; (4) cell reselection based on LP WUS; (5) logging of available measurements of LP WUS if configured; and (6) idle measurements of low power signals LP WUS if configured.

A UE in an RRC_INACTIVE state can operate in a power-saving mode. In one embodiment, the power-saving mode in the RRC_INACTIVE state can be characterized by a UE performing one or more of the following operations based on LP WUS: (1) monitoring LP WUS of the camped cell; (2) UE controlled mobility based on LP WUS; (3) storing the UE inactive AS context; (4) neighbor cell measurement of LP WUS; (5) cell reselection based on LP WUS; (6) logging of available measurements of LP WUS if configured; and (7) idle measurements of LP WUS if configured.

Figure 6:
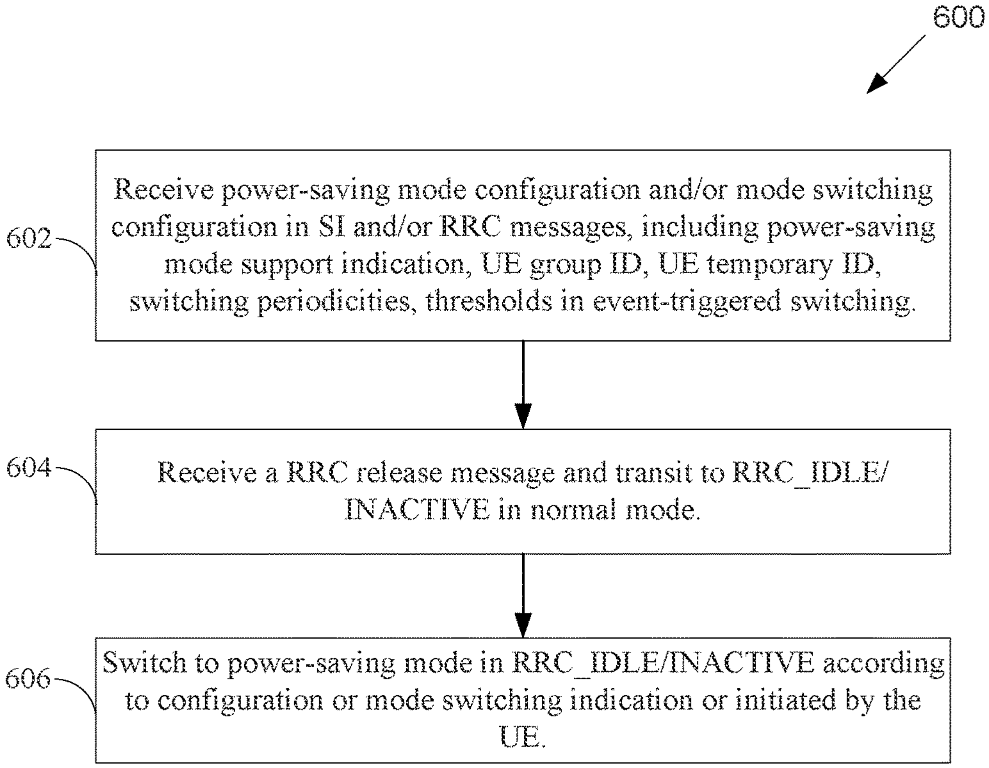
FIG. 6 illustrates a flowchart of a UE method for a switching operation from a normal mode to a power saving mode in an RRC_IDLE/INACTIVE state according to embodiments of the present disclosure.

FIG. 6 illustrates a flowchart of a UE method 600 for a switching operation from a normal mode to a power saving mode in an RRC_IDLE/INACTIVE state according to embodiments of the present disclosure. The UE method 600 as may be performed by a UE (e.g., 111-116 as illustrated in FIG. 1). An embodiment of the UE method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

Figure 7:
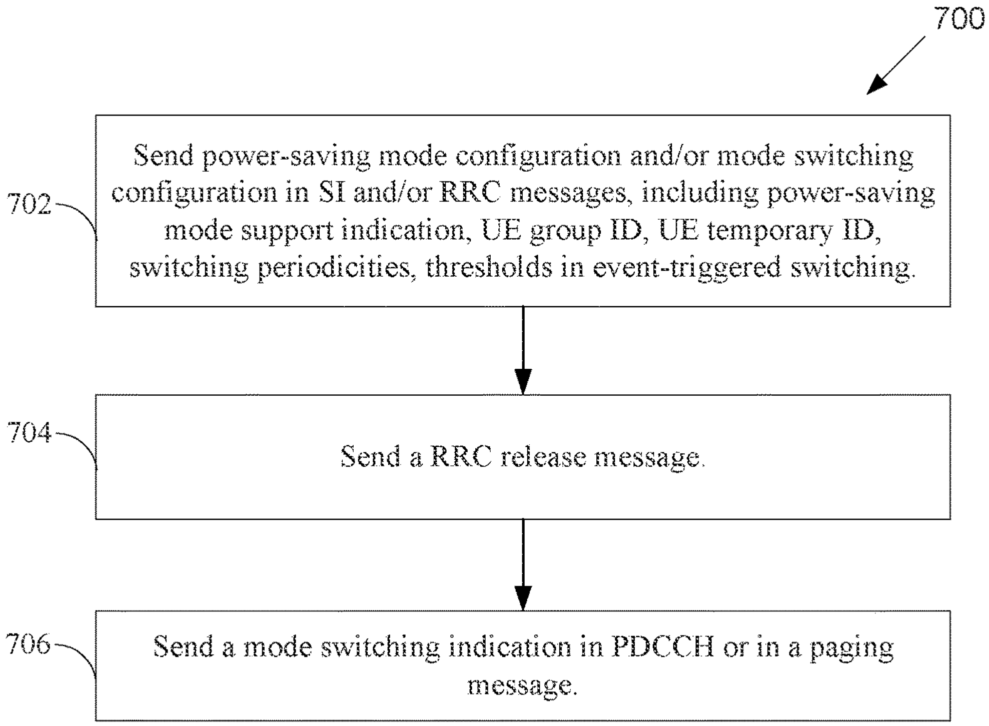
FIG. 7 illustrates a flowchart of a BS method for a switching operation from a normal mode to a power saving mode in an RRC_IDLE/INACTIVE state according to embodiments of the present disclosure.

FIG. 7 illustrates a flowchart of a BS method 700 for a switching operation from a normal mode to a power saving mode in an RRC_IDLE/INACTIVE state according to embodiments of the present disclosure. The BS method 700 as may be performed by a BS (e.g., 101-103 as illustrated in FIG. 1). An embodiment of the BS method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

A UE supporting a power-saving mode can switch an operation mode from a normal mode to a power-saving mode to save power consumption if the current serving cell supports LP WUS. In one embodiment, as illustrated in FIG. 6 and FIG. 7, switching to a power-saving mode can be configured or dynamically indicated by the NW or UE initiated. FIG. 6 illustrates the UE behavior for switching an operation mode from a normal mode to a power saving mode in an RRC_IDLE/INACTIVE state. FIG. 7 illustrates the BS behavior for switching an operation mode from a normal mode to a power saving mode in an RRC_IDLE/INACTIVE state.

As illustrated in FIG. 6, the UE can receive a power-saving mode configuration and/or a mode switching configuration which can be included in an SI and/or RRC messages (e.g., RRCReconfiguration, RRCRelease) from the serving cell (602). The configurations can include an explicit indication that LP WUS is supported in the current serving cell; alternatively, the support of LP WUS can be implicitly indicated by including the power-saving mode configuration and/or mode switching configuration.

The power-saving mode configuration can include a group ID and/or temporary ID assigned to the UE. The group ID indicates the group that UE belongs to. The group ID and/or temporary ID can be carried by the LP WUS and used to identify a wake-up indication for the UE. The mode switching configuration can include switching periodicities. For instance, a periodicity of switching from a normal mode to a power-saving mode can be configured. In another example, a periodicity of switching from a power-saving mode to a normal mode can be configured. The mode switching configuration can also include parameters for event-triggered switching (e.g., a normal mode to a power-saving mode, a power-saving mode to a normal mode). The event triggering mode switching can be pre-defined or configured.

In one example, a periodicity of switching is X ms starting from SFN 0. For every even period or for every A periods, a UE enters a power saving mode. For every odd period or for every B periods, a UE enters a normal mode. X, and/or A, and/or B can be configurable numbers.

In one example, a periodicity of switching is X ms starting from SFN 0. At the start of each period, a UE enters a power saving mode for Y ms. X and Y can be configurable or fixed numbers.

When receiving an RRC connection release message, the UE transits to an RRC_IDLE/INACTIVE state and performs the procedures specified in 3GPP standard specification upon receiving the RRCRelease (604). The RRC connection release message can include an information field indicating the UE is allowed to operate in a power-saving mode in an RRC_IDLE/INACTIVE state. If the power-saving mode allowed is indicated, the UE can switch to the power-saving mode in the RRC_IDLE/INACTIVE state if supported; otherwise, the UE is not allowed to switch to the power-saving mode in the RRC_IDLE/INACTIVE state. In another example, the RRC connection release message can include an information field associated with the redirected carrier frequency indicating LP WUS is supported in the redirected frequency. If LP WUS supported is indicated, the UE can switch to a power-saving mode in an RRC_IDLE/INACTIVE state if supported; otherwise, the UE is not allowed to switch to the power-saving mode in the RRC_IDLE/INACTIVE state.

In one more example, a list of frequencies for which LP WUS is supported can be included in the RRC release message. If LP WUS is supported for a frequency, a UE can switch an operation mode to a power-saving mode on that frequency in an RRC_IDLE/INACTIVE state; otherwise, the UE is not allowed to switch the operation mode to the power-saving mode on that frequency in the RRC_IDLE/INACTIVE state.

As illustrated in FIG. 6, in an RRC_IDLE/INACTIVE state, the UE can switch a mode from a normal mode to a power-saving mode (606). In one example, the switching operation can be performed periodically if the periodicity of switching from a normal mode to a power-saving mode is configured.

In one example, a periodicity of switching is X ms starting from SFN 0. For every even period or for every A periods, a UE enters a power saving mode. For every odd period or for every B periods, a UE enters a normal mode. X, and/or A, and/or B can be configurable numbers.

In one example, a periodicity of switching is X ms starting from SFN 0. At the start of each period, a UE enters a power saving mode for Y ms. X and Y can be configurable or fixed numbers.

In another example (606), the UE can receive a mode switching indication carried in PDCCH (e.g., included in short message or PEI). The UE monitors PDCCH at PDCCH monitoring occasions for paging as specified in 3GPP standard specification. If the UE receives a mode switching indication (e.g., included in short message or PEI) in the UE's PDCCH monitoring occasions, the UE switches a mode to a power-saving mode if supported.

In yet another example (606), the UE can receive a mode switching indication carried in PDSCH (e.g., included in paging message). The mode switching indication can be indicated as a paging cause, e.g., power saving, in the paging message. The UE monitors PDCCH at PDCCH monitoring occasions for paging and receives the paging message transmitted in PDSCH according to the scheduling information carried by the PDCCH as specified in 3GPP standard specification.

If in an RRC_IDLE state, a mode switching indication is included in the paging message, and if the ue-Identity included in the paging message matches the UE identity allocated by upper layers, the UE sends an indication to lower layers to switch an operation mode to a power-saving mode if supported. If in an RRC_INACTIVE state, a mode switching indication is included in the paging message, and if the ue-Identity included in the paging message matches the UE's stored fullI-RNTI, the UE sends an indication to lower layers to switch an operation mode to a power-saving mode if supported.

Alternatively, if in an RRC_INACTIVE state, a mode switching indication is included in the paging message, and if the ue-Identity included in the paging message matches the UE's stored fullI-RNTI, the UE can initiate the RRC connection resumption procedure and send a RRCResumeRequest message with a resume cause (e.g., setting to power saving or mode switching), then upon receiving the RRCRelease message, the UE transits to an RRC_IDLE/INACTIVE state and operates in a power-saving mode.

In another example, if in an RRC_IDLE/INACTIVE state, a UE receives a mode switching indication without UE-identity in the paging message, the UE sends an indication to lower layers and switches an operation mode to a power-saving mode if supported.

In yet another example (606), in an RRC_INACTIVE state, the UE can initiate a power-saving mode switching with a notification to the NW. The power-saving mode switching notification can be sent in an RRCResumeRequest message. When the UE determines to switch an operation mode to a power-saving mode, the UE applies the RRC connection resumption procedure and sends a RRCResumeRequest message with a resume cause (e.g., setting to power saving or mode switching), then upon receiving the RRCRelease message, the UE transits to an RRC_IDLE/INACTIVE state and operates in a power-saving mode.

In one example, a UE can indicate its interest for switching an operation mode to a power-saving mode to a NW via an RRC message when the UE is in an RRC_CONNECTED state or an RRC_INACTIVE state. When the UE receives an RRCRelease message including a mode switch indication, the UE switches the operation mode to a power-saving mode in an RRC_IDLE/INACTIVE state according to the indication.

After switching to a power-saving mode in an RRC_IDLE/INACTIVE state in the disclosed embodiments, the UE performs the operations specified for a power-saving mode in an RRC_IDLE/INACTIVE state, e.g., as listed above.

Figure 8:
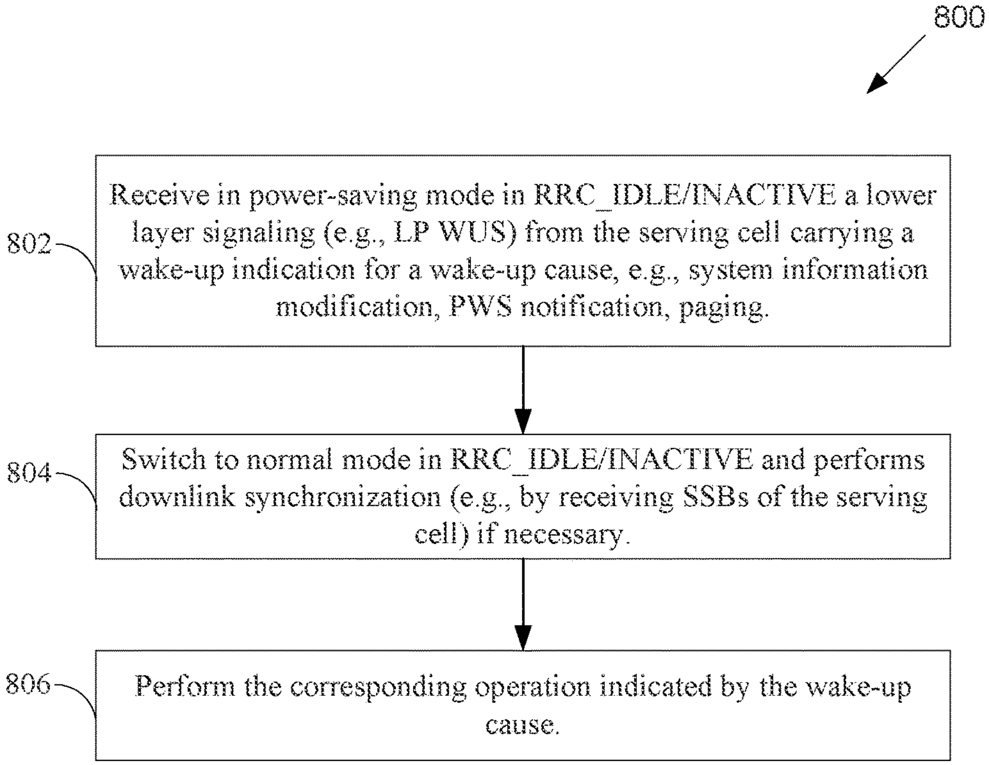
FIG. 8 illustrates a flowchart of a method for a NW controlled switching operation from a power-saving mode to a normal mode in an RRC_IDLE/INACTIVE state according to embodiments of the present disclosure.

FIG. 8 illustrates a flowchart of a method 800 for a NW controlled switching operation from a power-saving mode to a normal mode in an RRC_IDLE/INACTIVE state according to embodiments of the present disclosure. The method 800 as may be performed by a BS (e.g., 101-103 as illustrated in FIG. 1). An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

In an RRC_IDLE/INACTIVE state, a UE in a power-saving mode can switch an operation mode to a normal mode controlled by the NW due to different causes. In one embodiment, as illustrated in FIG. 8, the UE in a power-saving mode in an RRC_IDLE/INACTIVE state receives a lower layer signaling (e.g., LP WUS) from the serving cell carrying a wake-up indication with a wake-up cause, e.g., system information modification, public warning system (PWS) notification, paging. The UE then switches an operation mode to a normal mode in an RRC_IDLE/INACTIVE/CONNECTED state and performs downlink synchronization (e.g., by receiving SSBs of the serving cell) if necessary. The UE performs the corresponding operation indicated by the wake-up cause.

As illustrated in FIG. 8, in one example, a switching operation from a power saving mode to a normal mode can be triggered by SI modification. Upon receiving a wake-up indication from lower layers for the wake-up cause "SI modification" in a power-saving mode in an RRC_IDLE/INACTIVE state, the UE switches an operation mode to a normal mode in an RRC_IDLE/INACTIVE state (e.g., by turning on MR), performs downlink synchronization (e.g., by receiving SSBs of the serving cell) if necessary, and applies the SI acquisition procedure as specified in 3GPP standard specification. The wake-up cause an "SI modification" can be indicated by one bit carried by LP WUS.

As illustrated in FIG. 8, in another example, a switching operation from a power saving mode to a normal mode can be triggered by a PWS notification. Upon receiving a wake-up indication from lower layers for the wake-up cause "PWS notification" in a power-saving mode in RRC_IDLE/INACTIVE state, the UE switches an operation mode to a normal mode in an RRC_IDLE/INACTIVE state (e.g., by turning on MR) and performs downlink synchronization (e.g., receiving SSBs of the serving cell) if necessary. Then, the UE acquires the SIB(s) containing a PWS notification, including ETWS and/or CMAS notification, for instance, if the UE is ETWS capable or CMAS capable: (1) if the UE is provided with searchSpaceSIB1 and searchSpaceOtherSystemInformation on the active BWP or the initial BWP, immediately re-acquire the SIB1; else, apply the MIB and SIB1 acquisition procedure; (2) if the UE is ETWS capable and si-SchedulingInfo in SIB1 includes scheduling information for SIB6, acquire SIB6 immediately; (3) if the UE is ETWS capable and si-SchedulingInfo in SIB1 includes scheduling information for SIB7, acquire SIB7 immediately; and (4) if the UE is CMAS capable and si SchedulingInfo in SIB1 includes scheduling information for SIB8, acquire SIB8 immediately. The wake-up cause "PWS notification" can be indicated by one bit carried by LP WUS.

As illustrated in FIG. 8, in another example, a switching operation from a power saving mode to a normal mode can be triggered by paging (e.g., RAN paging, CN paging). Upon receiving a wake-up indication from lower layers with the wake-up cause "paging" in a power-saving mode in RRC_IDLE/INACTIVE state, the UE switches an operation mode to a normal mode in an RRC_IDLE/INACTIVE state (e.g., by turning on MR) and performs downlink synchronization (e.g., receiving SSBs of the serving cell) if necessary. Once operating in a normal mode in an RRC_IDLE/INACTIVE state, a UE can start to monitor paging early indication (PEI) if the PEI is supported. The UE determines the PEI occasion as specified in 3GPP standard specification. When the UE detects the PEI and the PEI indicates that the UE needs to monitor the associated paging occasion (PO), the UE monitors the associated PO. If the UE cannot monitor the PEI, the UE directly monitors paging occasions.

To monitor PO, if the UE has stored parameters (e.g., Ns, nAndPagingFrameOffset, nrofPDCCH-MonitoringOccasionPerSSB-InPO, default/extended DRX Cycle length, nAndPagingFrameOffset, firstPDCCH-MonitoringOccasionOfPO, pagingSearchSpace, firstPDCCH-MonitoringOccasionOfPO) that are needed to determine the paging occasion in time and frequency domain, the UE applies the stored parameters to determine and monitor its first paging occasion after switching. Otherwise (e.g., any of the relevant parameters are not available/stored/configured), the UE acquires system information (e.g., SIB1) and applies the parameters signaled in system information (e.g., SIB1) to determine its first paging occasion.

For a NW-controlled switching operation to a normal mode, the UE can be controlled to wake up in groups or in UE-dedicated manner, either with or without a wake-up cause indication (e.g., SI modification, PWS notification, or paging). In one embodiment, the UE can be configured (e.g., in a power-saving mode configuration) with a group ID or a temporary ID (e.g., RNTI) before entering an RRC_IDLE/INACTIVE state. Upon receiving a wake-up indication (e.g., carried by LP WUS) in a power-saving mode in an RRC_IDLE/INACTIVE state that indicates the UE's group ID or the UE's temporary ID, the UE switches an operation mode to a normal mode in an RRC_IDLE/INACTIVE/CONNECTED state. The UE then performs the corresponding operation for the wake-up cause if a wake-up cause is indicated.

In another embodiment, in an RRC_IDLE/INACTIVE state, a UE in a power-saving mode can switch an operation mode to a normal mode initiated by the UE due to different causes.

Figure 9:
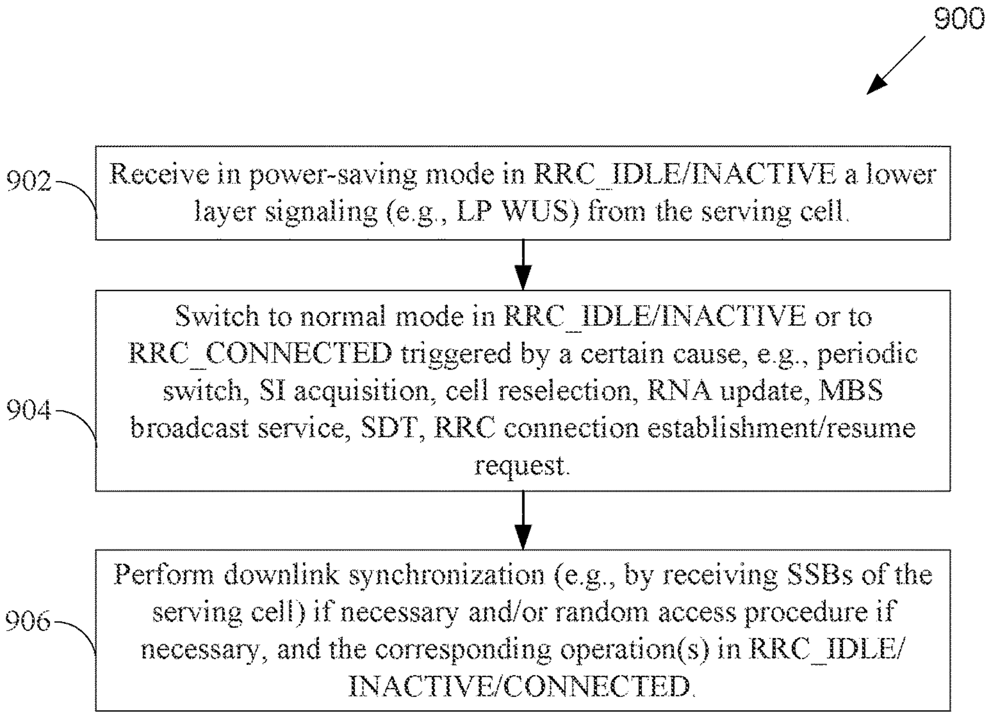
FIG. 9 illustrates a flowchart of a UE method for a switching operation from a power-saving mode to a normal mode in an RRC_IDLE/INACTIVE state according to embodiments of the present disclosure.

FIG. 9 illustrates a flowchart of a UE method 900 for a switching operation from a power-saving mode to a normal mode in an RRC_IDLE/INACTIVE state according to embodiments of the present disclosure. The UE method 900 as may be performed by a UE (e.g., 111-116 as illustrated in FIG. 1). An embodiment of the UE method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, the UE in a power-saving mode in an RRC_IDLE/INACTIVE state receives a lower layer signaling (e.g., LP WUS) from the serving cell. The UE can switch an operation mode to a normal mode in an RRC_IDLE/INACTIVE state or switch to an RRC_CONNECTED state autonomously triggered by a certain cause, indicated by the lower layer signaling (e.g., LP WUS), including periodic switching to a normal mode, SI acquisition, cell reselection, RNA update, multicast/broadcast service (MBS), small data transmission (SDT), RRC connection establishment request, and RRC resume request. The UE can turn on MR, perform downlink synchronization (e.g., by receiving SSBs of the serving cell) if necessary and/or random access procedure if necessary, and perform the corresponding operation(s) in an RRC_IDLE/INACTIVE/CONNECTED state.

As illustrated in FIG. 9, in one example, the UE can switch an operation mode from a power-saving mode to a normal mode in an RRC_IDLE/INACTIVE state periodically. The periodicity of switching can be pre-defined or configured by the NW or up to UE implementation.

In one example, a periodicity of switching is X ms starting from SFN 0. For every even period or for every A periods, a UE enters a power saving mode. For every odd period or for every B periods, a UE enters a normal mode. X, and/or A, and/or B can be configurable numbers.

In one example, a periodicity of switching is X ms starting from SFN 0. At the start of each period, a UE enters a power saving mode for Y ms. X and Y can be configurable or fixed numbers.

As illustrated in FIG. 9, in one example, a UE can switch an operation mode from a power-saving mode to a normal mode in an RRC_IDLE/INACTIVE state according to the switching indication carried by LP WUS. The UE can turn on MR, perform downlink synchronization (e.g., by receiving SSBs of the serving cell) if necessary, and operate in the normal mode in the RRC_IDLE/INACTIVE.

As illustrated in FIG. 9, in one example, the UE can switch an operation mode from a power-saving mode to a normal mode in an RRC_IDLE/INACTIVE state for SI acquisition if the validity of any SIB is expired. For instance, after a certain duration since a SIB was successfully confirmed as valid, the UE can consider the SIB is no more valid or the UE needs to delete any stored version of the SIB, and reacquire the SIB, where the duration can be pre-defined or configured. Upon the UE determines a SIB is no more valid or upon the UE deletes any stored version of a SIB, if the UE is in a power-saving mode in an RRC_IDLE/INACTIVE state, the UE switches an operation mode to a normal mode in an RRC_IDLE/INACTIVE state, performs downlink synchronization (e.g., by receiving SSBs of the serving cell) if necessary, and applies the SI acquisition procedure as specified in 3GPP standard specification.

As illustrated in FIG. 9, in another example, the UE can switch an operation mode from a power-saving mode to a normal mode in an RRC_IDLE/INACTIVE state for cell reselection. In one case, the UE switches an operation mode to a normal mode in an RRC_IDLE/INACTIVE state to start intra-frequency and/or inter-frequency and/or inter-RAT neighbor cell measurement based on SSBs for cell reselection. The exact timing for the switch can be event-triggered or up to UE implementation. In another case, the UE switches an operation mode to a normal mode in an RRC_IDLE/INACTIVE state to camp on a selected cell determined by cell reselection evaluation. The exact timing for the switch can be determined by the UE in the procedure of cell reselection based on the LP WUS.

As illustrated in FIG. 9, in one example, the UE can switch an operation mode from a power-saving mode to a normal mode in an RRC_INACTIVE state for periodic RNA update. For a UE in a power-saving mode in an RRC_INACTIVE state, upon the timer for RNA update expires (e.g., T380 as described in 3GPP standard specification), the UE switches an operation mode to a normal mode in an RRC_INACTIVE state, performs downlink synchronization if necessary, and initiates an RRC connection resume procedure for RNA update as specified in 3GPP standard specification.

As illustrated in FIG. 9, in yet another example, the UE can switch an operation mode from a power-saving mode to a normal mode in an RRC_IDLE/INACTIVE state for an MBS broadcast service. If a UE in a power-saving mode in an RRC_IDLE/INACTIVE state becomes interested to receive an MBS broadcast service, the UE switches an operation mode to a normal mode in an RRC_IDLE/INACTIVE state, performs downlink synchronization if necessary, acquires SIB(s) containing the information used to acquire the MCCH configuration, and applies the MCCH information acquisition procedure and the broadcast MRB establishment procedure to start receiving an MBS session of an MBS broadcast service the UE is interested in.

As illustrated in FIG. 9, in yet another example, the UE can switch an operation mode from a power-saving mode to a normal mode in an RRC_INACTIVE state for SDT. For a UE in a power-saving mode in an RRC_INACTIVE state, if the conditions for initiating SDT are fulfilled as specified in 3GPP standard specification, the UE switches an operation mode to a normal mode in an RRC_INACTIVE state, performs downlink synchronization if necessary, and performs an RRC connection resume procedure for SDT as specified in 3GPP standard specification.

As illustrated in FIG. 9, in yet another example, the UE can switch an operation mode from a power-saving mode to a normal mode in an RRC_IDLE state for RRC connection setup/establishment, where the RRC connection setup/establishment can be requested by upper layers (e.g., due to uplink data transmission). In this case, the UE switches an operation mode to a normal mode in an RRC_IDLE state upon receiving the RRC connection setup/establishment request from upper layers, performs downlink synchronization if necessary, and applies the RRC connection establishment procedure.

As illustrated in FIG. 9, in yet another example, the UE can switch an operation mode from a power-saving mode to a normal mode in an RRC_INACTIVE state for RRC connection resume, where the RRC connection resume can be requested by upper layers or AS. In this case, the UE switches an operation mode to a normal mode in an RRC_I-

NACTIVE state upon receiving the RRC connection resume request from upper layers or AS, performs downlink synchronization if necessary, and applies the RRC connection establishment procedure.

As illustrated in FIG. 8 and FIG. 9, the step of switching an operation mode to a normal mode in an RRC_IDLE/INACTIVE state in the disclosed embodiments of the present disclosure can include turning on MR and/or performing cell reselection. For a UE not supporting cell reselection in a power-saving mode in an RRC_IDLE/INACTIVE state, for switching an operation mode to a normal mode in an RRC_IDLE/INACTIVE state, the UE may need to perform cell reselection to a suitable cell.

In one embodiment, the UE needs to perform cell reselection after turning on MR if a certain condition is met. For instance, the condition can be a measurement quantity (e.g., RSRP, RSRQ, RSSI, RSARP, SINR) of LP WUS from the current serving cell in a power-saving mode is smaller than a configured threshold. In another example, the UE needs to perform cell reselection after turning on MR if cell reselection is configured in the operation of mode switching to a normal mode in an RRC_IDLE/INACTIVE state.

In an RRC_INACTIVE state, if the UE applies RRC connection resume procedure for the mode switching (e.g., from a normal mode to a power-saving mode, from a power-saving mode to a normal mode) in the disclosed embodiments of the present disclosure, the BS receiving the RRCResumeRequest message requests the last serving BS to provide UE context, providing the cause value received (e.g., a power-saving, a mode switch, RNA update) by an inter-node message. The current BS can also inform the last serving BS that the UE is or will be in a power-saving mode in an RRC_IDLE/INACTIVE state by including an indication in the inter-node message.

Once indicated to switch an operation mode to a normal mode or a power saving mode, a UE can stay in that mode for a pre-defined duration which can be in units of a DRX cycle (e.g., default DRX cycles in RRC_IDLE/INACTIVE state, or DRX cycle in an RRC_CONNECTED state.

Figure 10:
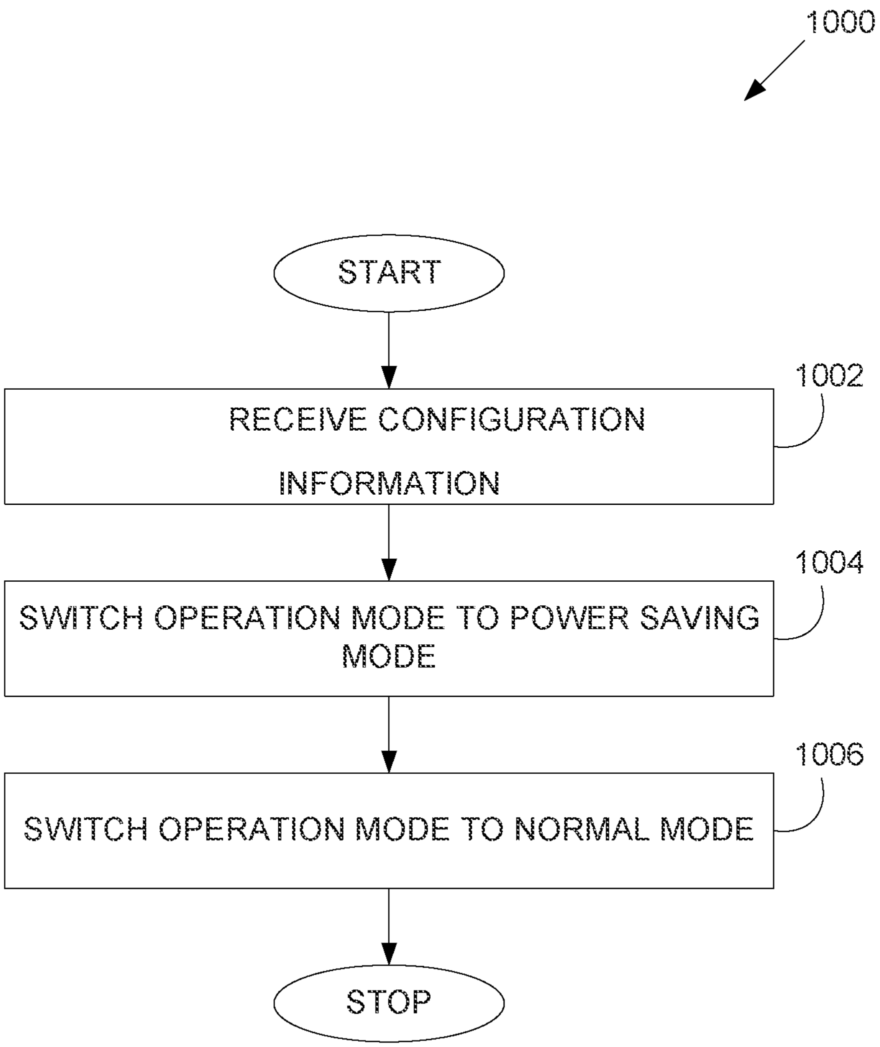
FIG. 10 illustrates a flowchart of a UE method for a mode switching operation to save power consumption in a wireless communication system according to embodiments of the present disclosure.

FIG. 10 illustrates a flowchart of a UE method 1000 for a mode switching operation to save power consumption in a wireless communication system according to embodiments of the present disclosure. The UE method 1000 as may be performed by a UE (e.g., 111-116 as illustrated in FIG. 1). An embodiment of the UE method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, the method 1000 begins at step 10002. In step 1002, the UE receives, from a BS, configuration information related to mode switching events including a first mode switching event and a second mode switching event.

In step 1002, the configuration information includes an indication of supporting for the LP-WUS.

In step 1004, the UE, when the first mode switching event occurs, switches an operation mode to a power saving mode from a normal mode by deactivating a MR operation and monitoring a LP-WUS.

In step 1006, the UE, when the second mode switching event occurs, switches the operation mode to the normal mode from the power saving mode by activating the MR operation.

In one embodiment, the UE switches the operation mode to the power saving mode from the normal mode when entering an RRC_IDLE/INACTIVE state from an RRC_CONNECTED state.

In one embodiment, the UE switches the operation mode to the normal mode from the power saving mode in an RRC_IDLE/INACTIVE state when the LP-WUS includes the group ID, wherein the configuration information includes a group ID.

In one embodiment, the UE determines whether system information (SI) that is stored in the UE is valid and switches, based on a determination that the SI is not valid, the operation mode to the normal mode from the power saving mode in an RRC_IDLE/INACTIVE state.

In one embodiment, the UE determines whether a cell is selected for a cell reselection operation and switches, based on a determination that the cell is selected for the cell reselection operation, the operation mode to the normal mode from the power saving mode in an RRC_IDLE/INACTIVE state.

In one embodiment, the UE determines whether signal quality of the LP-WUS meets a threshold and switches, based on a determination that the signal quality of the LP-WUS meets the threshold, the operation mode to the normal mode from the power saving mode in an RRC_IDLE/INACTIVE state.

In one embodiment, the UE receives the LP-WUS including a public warning system (PWS) notification and switches the operation mode to the normal mode from the power saving mode in an RRC_IDLE/INACTIVE state when the LP-WUS includes the PWS notification.

In one embodiment, the UE maintains the operation mode in the normal mode or the power saving mode for a time duration, wherein the time duration is identified in a unit of a discontinuous reception (DRX) cycle.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An electronic device comprising:

at least one processor including processing circuitry; and memory storing instructions, wherein the instructions, when executed by the at least one processor individually or collectively, cause the electronic device to:

receive, from a base station (BS), configuration information related to mode switching events including a first mode switching event and a second mode switching event; and when the first mode switching event occurs;

switch an operation mode to a power saving mode from a normal mode by deactivating a main radio (MR) and monitoring a low power-wake-up-signal (LP-WUS);

determine whether a signal quality of the LP-WUS meets a threshold; and switch, based on a determination that the signal quality of the LP-WUS meets the threshold, the operation mode to the normal mode from the power saving mode in an RRC_IDLE/INACTIVE state; and when the second mode switching event occurs, switch the operation mode to the normal mode from the power saving mode by activating the MR.

2. The electronic device of claim 1, wherein the configuration information includes an indication of support for the LP-WUS.

3. The electronic device of claim 1, wherein the instructions, when executed by the at least one processor individually or collectively, further cause the electronic device to switch the operation mode to the power saving mode from the normal mode when entering an RRC_IDLE/INACTIVE state from an RRC_CONNECTED state.

4. The electronic device of claim 1, wherein:

the configuration information includes a group identification (ID); and the instructions, when executed by the at least one processor individually or collectively, further cause the electronic device to switch the operation mode to the normal mode from the power saving mode in an RRC_IDLE/INACTIVE state when the LP-WUS includes the group ID.

5. The electronic device of claim 1, wherein the instructions, when executed by the at least one processor individually or collectively, further cause the electronic device to:

determine whether system information (SI) that is stored in the electronic device is valid; and switch, based on a determination that the SI is not valid, the operation mode to the normal mode from the power saving mode in an RRC_IDLE/INACTIVE state.

6. The electronic device of claim 1, wherein the instructions, when executed by the at least one processor individually or collectively, further cause the electronic device to:

determine whether a cell is selected for a cell reselection operation; and switch, based on a determination that the cell is selected for the cell reselection operation, the operation mode to the normal mode from the power saving mode in an RRC_IDLE/INACTIVE state.

7. The electronic device of claim 1, wherein the signal quality of the LP-WUS includes one or more of:

a reference signal received power (RSRP) of the LP-WUS;

a reference signal received quality (RSRQ) of the LP-WUS;

a received signal strength indicator (RSSI) of the LP-WUS;

a reference signal antenna relative phase (RSARP) of the LP-WUS; or a signal-to-interference-plus-noise-ratio (SINR) of the LP-WUS.

8. The electronic device of claim 1, wherein:

the instructions, when executed by the at least one processor individually or collectively, further cause the electronic device to:

receive the LP-WUS including a public warning system (PWS) notification; and switch the operation mode to the normal mode from the power saving mode in an RRC_IDLE/INACTIVE state when the LP-WUS includes the PWS notification.

9. The electronic device of claim 1, wherein:

the instructions, when executed by the at least one processor individually or collectively, further cause the electronic device to maintain the operation mode in the normal mode or the power saving mode for a time duration; and the time duration is identified in a unit of a discontinuous reception (DRX) cycle.

10. A method of a user equipment (UE) in a wireless communication system, the method comprising:

receiving, from a base station (BS), configuration information related to mode switching events including a first mode switching event and a second mode switching event;

when the first mode switching event occurs:

switching an operation mode to a power saving mode from a normal mode by deactivating a main radio (MR) operation and monitoring a low power-wake-up-signal (LP-WUS);

determining whether a signal quality of the LP-WUS meets a threshold; and switching, based on a determination that the signal quality of the LP-WUS meets the threshold, the operation mode to the normal mode from the power saving mode in an RRC_IDLE/INACTIVE state; and when the second mode switching event occurs, switching the operation mode to the normal mode from the power saving mode by activating the MR operation.

11. The method of claim 10, wherein the configuration information includes an indication of support for the LP-WUS.

12. The method of claim 10, further comprising switching the operation mode to the power saving mode from the normal mode when entering an RRC_IDLE/INACTIVE state from an RRC_CONNECTED state.

13. The method of claim 10, further comprising switching the operation mode to the normal mode from the power saving mode in an RRC_IDLE/INACTIVE state when the LP-WUS includes a group identifier (ID), wherein the configuration information includes the group ID.

14. The method of claim 10, further comprising:

determining whether system information (SI) that is stored in the UE is valid; and switching, based on a determination that the SI is not valid, the operation mode to the normal mode from the power saving mode in an RRC_IDLE/INACTIVE state.

15. The method of claim 10, further comprising:

determining whether a cell is selected for a cell reselection operation; and switching, based on a determination that the cell is selected for the cell reselection operation, the operation mode to the normal mode from the power saving mode in an RRC_IDLE/INACTIVE state.

16. The method of claim 10, wherein the signal quality of the LP-WUS includes one or more of:

a reference signal received power (RSRP) of the LP-WUS;

a reference signal received quality (RSRQ) of the LP-WUS;

a received signal strength indicator (RSSI) of the LP-WUS;

a reference signal antenna relative phase (RSARP) of the LP-WUS; or a signal-to-interference-plus-noise-ratio (SINR) of the LP-WUS.

17. The method of claim 10, further comprising:

receiving the LP-WUS including a public warning system (PWS) notification; and switching the operation mode to the normal mode from the power saving mode in an RRC_IDLE/INACTIVE state when the LP-WUS includes the PWS notification.

18. The method of claim 10, further comprising maintaining the operation mode in the normal mode or the power saving mode for a time duration, wherein the time duration is identified in a unit of a discontinuous reception (DRX) cycle.

19. A method of operating a base station (BS), the BS comprising:

generating configuration information related to mode switching events including a first mode switching event and a second mode switching event; and transmitting, to a user equipment (UE), configuration information to switch an operation mode, wherein:

when the first mode switching event occurs, the operation mode is switched to a power saving mode from a normal mode by deactivating a main radio (MR) operation and monitoring a low power-wake-up-signal (LP-WUS), and when the (i) second mode switching event occurs and (ii) a signal quality of the LP-WUS meets a threshold, the operation mode is switched to the normal mode from the power saving mode by activating the MR operation.

20. The method of claim 19, wherein the configuration information includes at least one of:

an indication of support for the LP-WUS;

a group identification (ID); and a public warning system (PWS) notification.

* * * * *